(12) United States Patent
Yano

(10) Patent No.: US 9,690,019 B2
(45) Date of Patent: Jun. 27, 2017

(54) IMAGE DISPLAY APPARATUS FOR ENDOSCOPE IMAGES, COLOR FILTER WITH FOURTH PIXEL OF A LUMINOUS COLOR OF PIGMENT OF HEMOGLOBIN, AND IMAGE SIGNAL PROCESSING APPARATUS

(71) Applicant: Sony Corporation, Tokyo (JP)

(72) Inventor: Tomoya Yano, Kanagawa (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 14/640,522

(22) Filed: Mar. 6, 2015

(65) Prior Publication Data

US 2015/0279261 A1 Oct. 1, 2015

(30) Foreign Application Priority Data

Mar. 26, 2014 (JP) ................................. 2014-063354

(51) Int. Cl.
*G02B 5/22* (2006.01)
*G02B 5/20* (2006.01)

(52) U.S. Cl.
CPC ..... *G02B 5/201* (2013.01); *G09G 2300/0452* (2013.01); *G09G 2340/06* (2013.01)

(58) Field of Classification Search
CPC .................. G02B 6/0068; G02B 5/201; G09G 2320/0666; G09G 2300/0452; G09G 2340/06
USPC ....................................................... 345/694
See application file for complete search history.

(56) References Cited

U.S. PATENT DOCUMENTS

| | | | | |
|---|---|---|---|---|
| 6,243,059 B1 * | 6/2001 | Greene | ................. | G09G 3/2092 345/1.3 |
| 7,598,963 B2 * | 10/2009 | Brown Elliott | ........ | G06T 3/4015 345/428 |
| 7,760,177 B2 * | 7/2010 | Nakamura | ......... | G02F 1/133514 345/204 |
| 7,808,462 B2 * | 10/2010 | Tanase | ................. | G09G 3/2003 345/600 |
| 8,488,085 B2 * | 7/2013 | Nakamura | .............. | G02B 5/201 349/106 |
| 8,657,737 B2 * | 2/2014 | Saito | ................... | A61B 1/00009 600/160 |

(Continued)

FOREIGN PATENT DOCUMENTS

| | | |
|---|---|---|
| JP | 02-118521 | 5/1990 |
| JP | 04-54207 B2 | 8/1992 |

(Continued)

OTHER PUBLICATIONS

Sharp. "Sharp introduces complete range of 1080p LCD TVs, offering extraordinary detail, colour and contrast for Full High Definition viewing". M2 Presswire [Coventry] Oct. 4, 2006: 1.*

(Continued)

*Primary Examiner* — Julie Anne Watko
(74) *Attorney, Agent, or Firm* — Michael Best & Friedrich LLP (57) ABSTRACT

There is provided an image display apparatus including a pixel array which includes a first pixel of a red luminous color, a second pixel of a green luminous color, a third pixel of a blue luminous color, and a fourth pixel of a luminous color of pigment of hemoglobin.

7 Claims, 10 Drawing Sheets

(56) References Cited

U.S. PATENT DOCUMENTS

| | | | | |
|---|---|---|---|---|
| 8,922,690 | B2* | 12/2014 | Nakata | G02B 5/201 250/208.1 |
| 9,360,605 | B2* | 6/2016 | Pascal | G02B 5/201 |
| 2003/0063398 | A1* | 4/2003 | Abe | A61B 1/05 359/823 |
| 2003/0128223 | A1* | 7/2003 | Feintuch | G09G 5/005 345/613 |
| 2004/0263528 | A1* | 12/2004 | Murdoch | G09G 3/3208 345/600 |
| 2005/0285828 | A1 | 12/2005 | Inoue et al. | |
| 2007/0063946 | A1* | 3/2007 | Nakamura | G02F 1/133514 345/88 |
| 2007/0109331 | A1* | 5/2007 | Brown Elliott | G06T 3/4015 345/694 |
| 2007/0171623 | A1* | 7/2007 | Zagar | B60K 35/00 362/23.12 |
| 2009/0174638 | A1* | 7/2009 | Brown Elliott | G02F 1/133621 345/88 |
| 2010/0149225 | A1* | 6/2010 | Kamada | G02B 3/005 345/690 |
| 2010/0238102 | A1* | 9/2010 | Nakamura | G02F 1/133514 345/88 |
| 2010/0289885 | A1* | 11/2010 | Lu | H04N 5/2258 348/61 |
| 2013/0131517 | A1* | 5/2013 | Panasyuk | A61B 5/0059 600/473 |
| 2014/0055661 | A1* | 2/2014 | Imamura | G02B 27/286 348/342 |
| 2016/0045114 | A1* | 2/2016 | Dacosta | A61B 5/0059 600/476 |

FOREIGN PATENT DOCUMENTS

| | | |
|---|---|---|
| JP | 2006-133711 A | 5/2006 |
| JP | 2007059372 A * | 3/2007 |

OTHER PUBLICATIONS

Jeremy. "Why Astronomers use red light to read by". Medic Guide, Jul. 13, 2009. http://medicguide.blogspot.com/2009/07/why-astronomers-use-red-light-to-read.html.*

Mock, Steve. "Red Light Etiquette". Wayback archived Jun. 16, 2011. http://www.atmob.org/about/clubhouse/red-light-etiquette.pdf.*

Heypete. "Making screen red to preserve night vision while doing astronomical observations?" Ubuntu forums: Education & Science. Wayback archived May 28, 2011. http://ubuntuforums.org/showthread.php?t=1080867.*

* cited by examiner

| R | Hb | R | Hb |
|---|----|---|----|
| G | B  | G | B  |
| R | Hb | R | Hb |
| G | B  | G | B  |

FIG. 5B

| R | G | B | Hb | R | G | B | Hb |
|---|---|---|----|---|---|---|----|
| R | G | B | Hb | R | G | B | Hb |

IMAGE DISPLAY APPARATUS FOR ENDOSCOPE IMAGES, COLOR FILTER WITH FOURTH PIXEL OF A LUMINOUS COLOR OF PIGMENT OF HEMOGLOBIN, AND IMAGE SIGNAL PROCESSING APPARATUS

CROSS REFERENCE TO RELATED APPLICATIONS

This application claims the benefit of Japanese Priority Patent Application JP 2014-063354 filed Mar. 26, 2014, the entire contents of which are incorporated herein by reference.

BACKGROUND

The present technology relates to an image display apparatus, particularly, to an image display apparatus having a sub-pixel of a luminous color other than RGB colors, and a color filter or an image signal processing apparatus for the image display apparatus.

In an image display apparatus, a configuration in which each pixel of a display panel is configured by using four colored sub-pixels has been proposed in the related art in order to reduce power consumption when display is performed (see Japanese Examined Patent Application Publication No. 4-54207). Specifically, the four colored sub-pixels refer to sub-pixels with three colors of red (R), green (G), and blue (B) and a sub-pixel with a color (Z) having luminance higher than the luminance of these three colors. When a natural image is displayed, the frequency of white is the highest typically. Thus, a self-luminous display in which, for example, a sub-pixel with a white color (W) is used as a fourth sub-pixel has been proposed (see Japanese Unexamined Patent Application Publication No. 2006-133711, for example).

SUMMARY

According to the above-described related art, a sub-pixel with a white color is used as a fourth sub-pixel and thus it is possible to improve luminance efficiency and to reduce power consumption, compared to when an image signal for three colors is supplied to each pixel having a sub-pixel structure of three colors being general RGB colors and display is performed. However, the frequency representing a red colored region is higher than the frequency representing white in a medical image such as an image captured by an endoscope. Accordingly, there is a problem in a case of, for example, a self-luminous display such as an organic EL display in that the frequency of using an R pixel increases and the R pixel rapidly deteriorates.

It is desirable to provide a sub-pixel structure suitable for displaying a medical image.

According to a first embodiment of the present technology, there is provided an image display apparatus including a pixel array. The pixel array includes a first pixel of a red luminous color, a second pixel of a green luminous color, a third pixel of a blue luminous color, and a fourth pixel of a luminous color of pigment of hemoglobin. Accordingly, an effect of efficiently displaying an image which considerably includes a color of pigment of hemoglobin is obtained.

In the first embodiment, a luminous color of the fourth pixel may be defined to have strong light intensity in the order of a third region, a first region, and a second region when the first region including a wavelength of 500 nm, the second region including a wavelength of 550 nm, and the third region including a wavelength of 620 nm are set.

In the first embodiment, a signal conversion unit may be included and the signal conversion unit converts an input signal for sub-pixels with three colors of red, green, and blue into a signal for sub-pixels with four colors of red, green, blue, and a color of pigment of hemoglobin, for the pixel array. Accordingly, an effect is obtained in that four colors of red, green, blue and a color of pigment of hemoglobin are displayed on a panel in a form of color development light.

In the first embodiment, a density calculation unit and an image conversion unit may be included. The density calculation unit calculates distribution of density of pigment of hemoglobin from an input signal for sub-pixels of three colors which are red, green, and blue. The image conversion unit performs image conversion in accordance with the density for the pixel array. Accordingly, an effect of adjusting the density of the pigment of hemoglobin is obtained. In this case, the image conversion unit may perform the image conversion in such a manner that density at a portion having high density is increased and density at a portion having low density is decreased.

According to a second embodiment of the present technology, there is provided a color filter which is provided to correspond to a pixel array including a first pixel of a red luminous color, a second pixel of a green luminous color, a third pixel of a blue luminous color, and a fourth pixel of a luminous color of pigment of hemoglobin. Accordingly, an effect of efficiently displaying an image which considerably includes a color of pigment of hemoglobin is obtained on the assumption of a uniform backlight.

According to a third embodiment of the present technology, there is provided an image signal processing apparatus including a signal conversion unit that converts an input signal for sub-pixels with three colors of red, green, and blue into a signal for sub-pixels with four colors of red, green, blue, and a color of pigment of hemoglobin, for a pixel array including a first pixel of a red luminous color, a second pixel of a green luminous color, a third pixel of a blue luminous color, and a fourth pixel of a luminous color of pigment of hemoglobin. Accordingly, an effect is obtained in that a signal for efficiently displaying an image which considerably includes a color of pigment of hemoglobin is generated.

According to a fourth embodiment of the present technology, there is provided an image signal processing apparatus including a density calculation unit and an image conversion unit. The density calculation unit calculates distribution of density of pigment of hemoglobin from an input signal for sub-pixels with three colors of red, green, and blue. The image conversion unit performs image conversion in accordance with the density, for a pixel array including a first pixel of a red luminous color, a second pixel of a green luminous color, a third pixel of a blue luminous color, and a fourth pixel of a luminous color of pigment of hemoglobin. Accordingly, an effect is obtained in that the density of the pigment of hemoglobin is adjusted in order to display an image considerably including the color of the pigment of hemoglobin.

According to the embodiments of this technology, it is possible to obtain an effect in which when a medical image is displayed, deterioration of pixels can be prevented and power consumption can be reduced. The effects described herein are not necessarily limited thereto and may include any effect described in the present disclosure.

DETAILED DESCRIPTION OF EMBODIMENTS

Hereinafter, a configuration (below referred to as an embodiment) for implementing this technology will be described. Descriptions will be made in order as follows.
1. Embodiment (image display apparatus)
2. Modification Example (image signal processing apparatus)

1. Embodiment

Configuration of Image Display Apparatus

Figure 1:
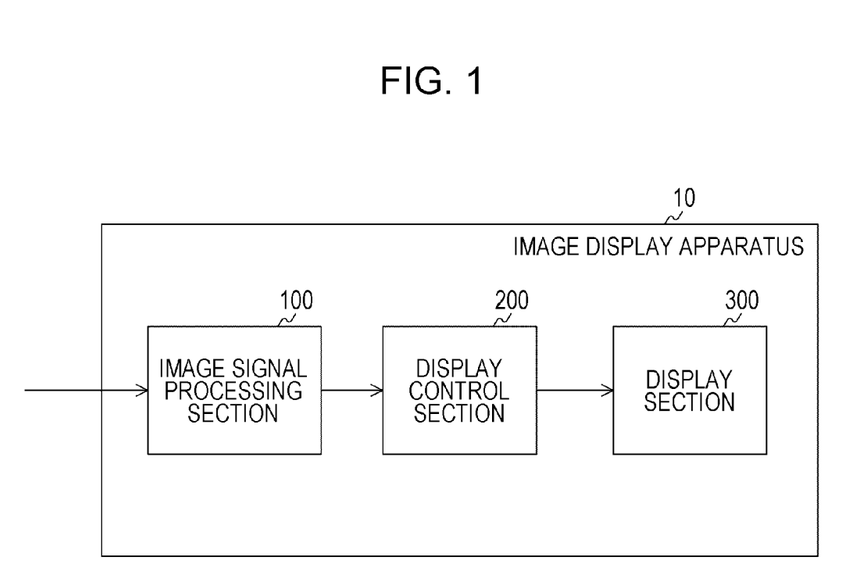
FIG. 1 is a diagram illustrating a configuration example of an image display apparatus according to an embodiment of the present technology.

FIG. 1 is a diagram illustrating a configuration example of an image display apparatus 10 according to an embodiment of the present technology. The image display apparatus 10 receives an input image signal and displays the image signal as an image. The image display apparatus 10 includes an image signal processing section 100, a display control section 200, and a display section 300.

The image signal processing section 100 performs predetermined signal processing on the input image signal. In this example, an RGB signal is assumed as the image signal and signal processing which will be described later is performed on the RGB signal such that a medical image can be appropriately displayed. The RGB signal includes colors of red, green, and blue as colors of sub-pixels.

The display control section 200 controls an image signal subjected to signal processing by the image signal processing section 100 to be displayed on the display section 300.

The display section 300 displays an image by control from the display control section 200.

Figure 2:
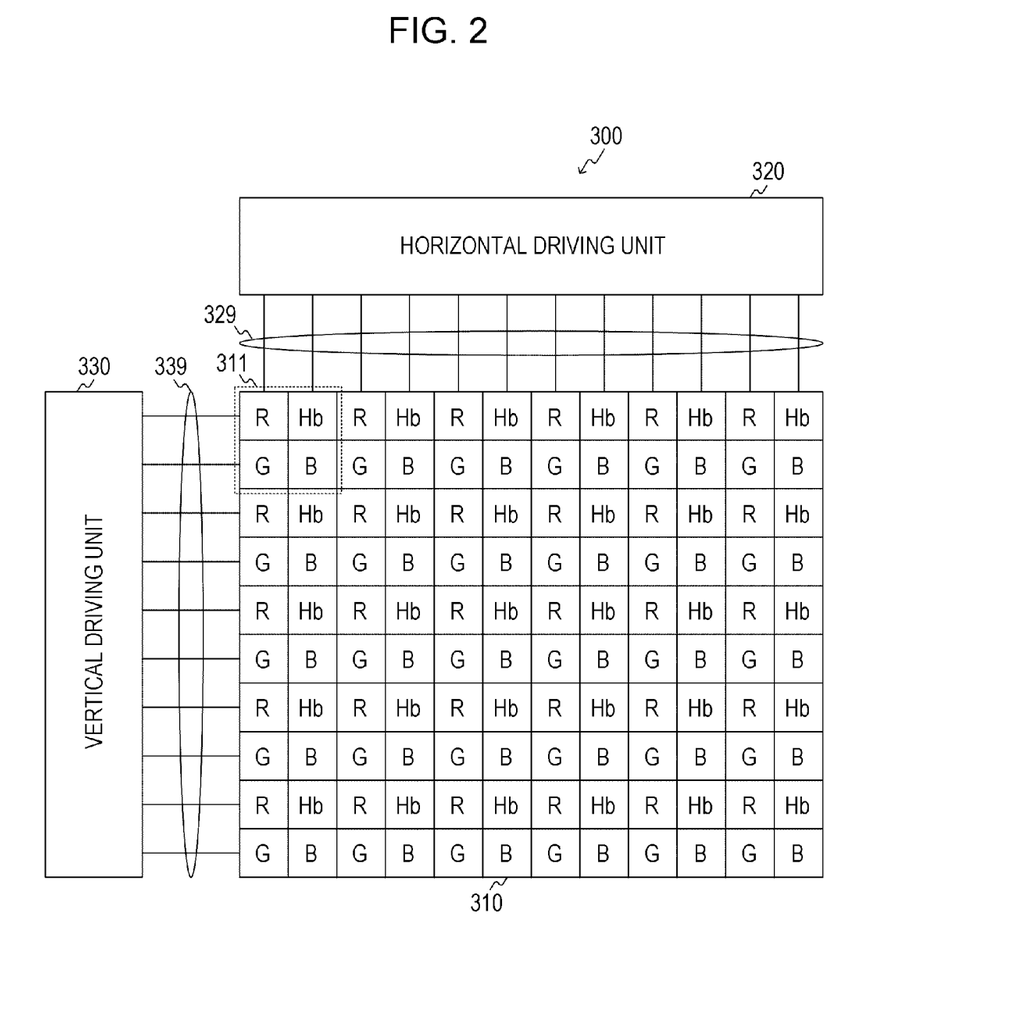
FIG. 2 is a diagram illustrating a configuration example of a display section according to the embodiment of the present technology.

FIG. 2 is a diagram illustrating a configuration example of the display section 300 according to the embodiment of the present technology. The display section 300 includes a pixel array portion 310, a horizontal driving unit 320, and a vertical driving unit 330.

Pixels 311 are arranged in a matrix in the pixel array portion 310. In this example, each of the pixels 311 is configured by four sub-pixels with red (R), green (G), blue (B), and a color (Hb) of pigment of hemoglobin. In this example, these four sub-pixels are aligned 2×2 in each pixel 311. Specifically, in each pixel 311, a sub-pixel of red is disposed on the upper left, a sub-pixel of green is disposed on the lower left, a sub-pixel of the color of the pigment of hemoglobin is disposed on the upper right, and a sub-pixel of blue is disposed on the lower right.

The vertical driving unit 330 generates a scanning signal based on timing control of the display control section 200, supplies the generated scanning signal to the pixel array portion 310 through a gate line 339, and thus selects sub-pixels in the pixel array portion 310 sequentially and performs line sequential scanning. The horizontal driving unit 320 generates a pixel signal based on timing control of the display control section 200, supplies the generated pixel signal to the pixel array portion 310 through a data line 329, and thus supplies the pixel signal to the sub-pixels in the pixel array portion 310.

Pigment of Hemoglobin

Figure 3:
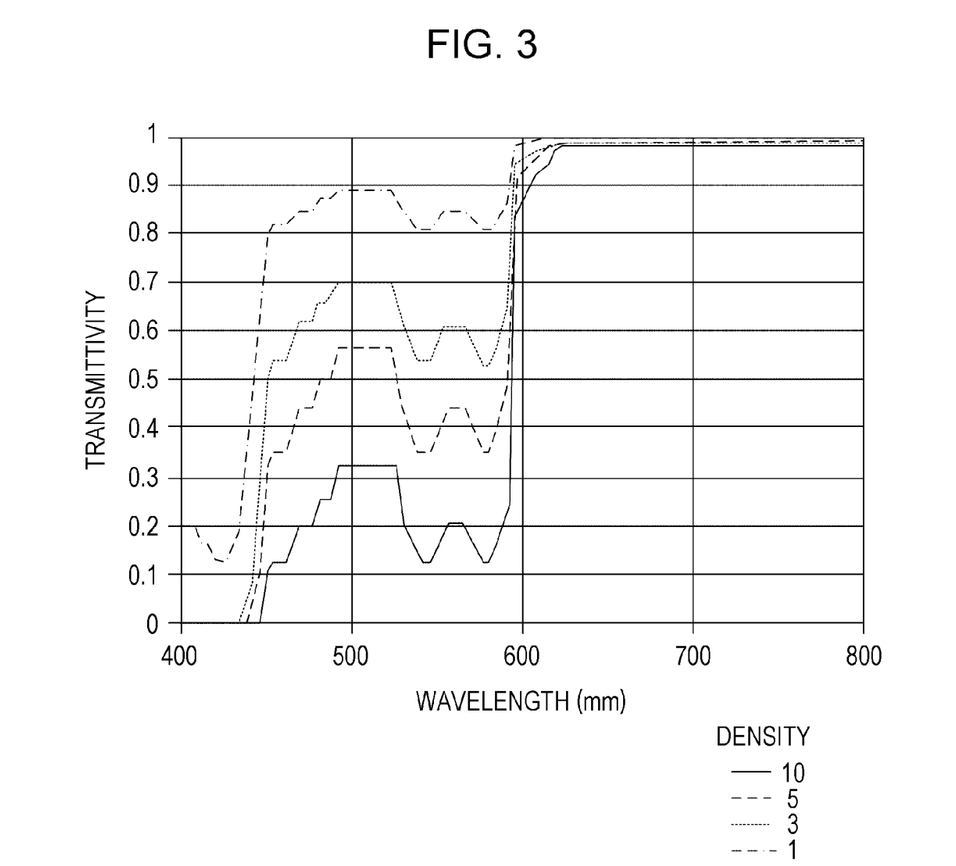
FIG. 3 is a diagram illustrating spectral characteristics of pigment of hemoglobin assumed in the embodiment of the present technology.

FIG. 3 is a diagram illustrating spectral characteristics of pigment of hemoglobin assumed in the embodiment of the present technology. A color of an image captured by an endoscope is determined based on density of hemoglobin in a blood vessel. Since others except for the blood vessel in an optical model are assumed as white diffusion members, colors of an endoscope image are distributed in a range from white to a color of the blood vessel (hemoglobin). In view of this, when a natural image is displayed, colors tend to be distributed on a curve of black body radiation and most of the colors are concentrated in the white. However, distribution tendency when a medical image such as an endoscope image is displayed is different from that when a natural image is displayed.

In FIG. 3, a horizontal axis indicates a wavelength of light. A vertical axis indicates transmittivity when pigment of hemoglobin is considered as a filter and means that light is transmitted more as the transmittivity becomes higher.

In a human body, hemoglobin is combined with oxygen ($HbO_2$) in an artery. On the other hand, hemoglobin is not combined with oxygen (Hb) in a vein. Light in the vein is absorbed more than light in the artery and thus a portion in the vein is shown darker than a portion in the artery. FIG. 3 illustrates a state ($HbO_2$) of hemoglobin in the artery as density. In FIG. 3, the density is a relative index and FIG. 3 indicates that transmittivity becomes lower as the density increases in the order of "1", "3", "5", and "10" but the spectral characteristics of the respective density values have a similar tendency.

Figure 4:
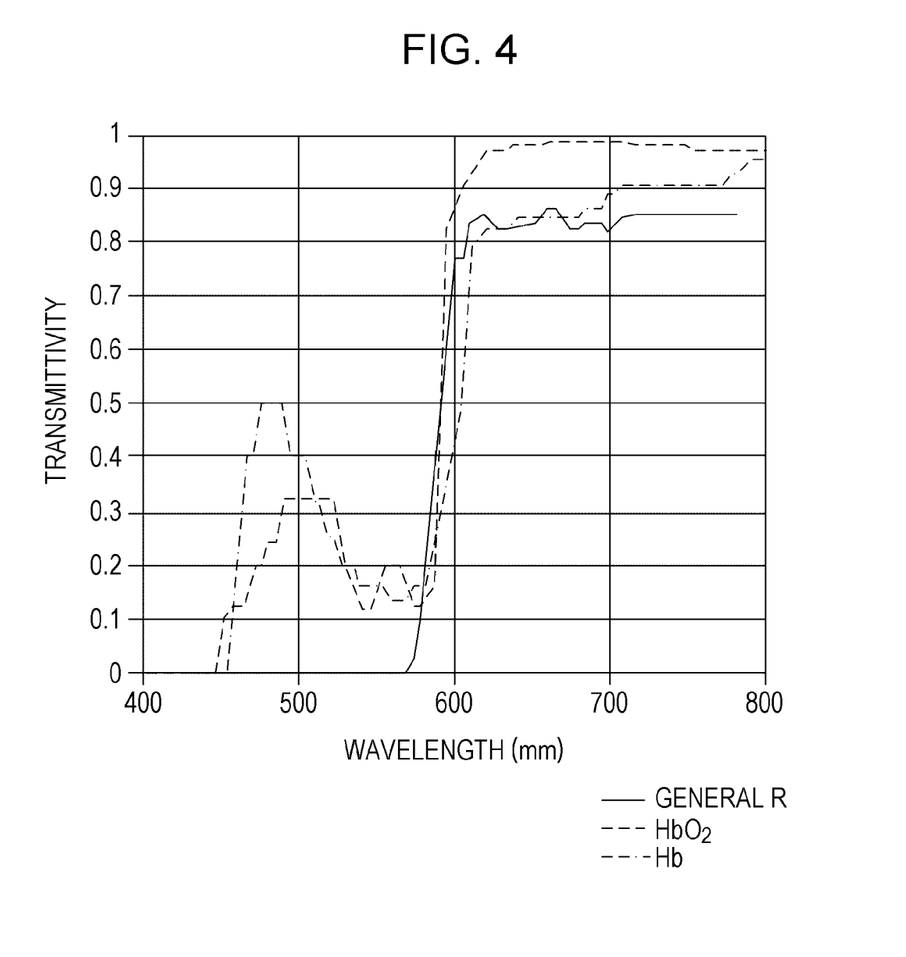
FIG. 4 is a comparison diagram illustrating spectral characteristics of red and the spectral characteristics of the pigment of hemoglobin assumed in the embodiment of the present technology.

FIG. 4 is a comparison diagram illustrating the spectral characteristics of red and the spectral characteristics of the pigment of hemoglobin assumed in the embodiment of the present technology. In FIG. 4, a solid line indicates spectral characteristics of general red (R), a dot line indicates the spectral characteristics of hemoglobin ($HbO_2$) combined with oxygen, and a chain line indicates the spectral characteristics of hemoglobin (Hb) which is not combined with oxygen. The spectral characteristics of the hemoglobin combined with oxygen correspond to a case of the density of "10" in FIG. 3.

In a case of red, the transmittivity increases greatly at a region from a wavelength of approximately 580 nm to a wavelength of approximately 600 nm, light is not transmitted at a region of wavelengths of equal to or less than approximately 580 nm, and light as much as 80% is transmitted at a region of wavelengths more than approximately 600 nm. On the other hand, in a case of hemoglobin, there is a tendency of the transmittivity increasing in the order of a third region, a first region, and a second region if a wavelength region is divided into the first region including a wavelength of 500 nm, the second region including a wavelength of 550 nm and the third region including a wavelength of 620 nm. The spectral characteristics of hemoglobin combined with oxygen and the spectral characteristics of hemoglobin which is not combined with oxygen have tendencies similar to each other. Accordingly, any case may be assumed in the embodiments according to the present technology and a pixel (Hb) in which a color of pigment of hemoglobin is used as a luminous color collectively in any assumed case is considered.

In the embodiments according to the present technology, the pixel (Hb) in which a color of pigment of hemoglobin having such spectral characteristics is used as a luminous color is set as a fourth pixel and thus it is possible to prevent deterioration of pixels and to reduce power consumption when a medical image is displayed. The spectral characteristics may be considered as luminous distribution when self-luminance is performed in a case of a self-luminous display such as an organic electroluminescence (EL). It is necessary to consider the spectral characteristics to be obtained through combining a color filter and dimming of a backlight in a case of a liquid crystal display. If a uniform backlight is assumed, a color filter in which a pixel of using a color of pigment of hemoglobin as a luminous color is set as the fourth pixel may be implemented.

Pixel Array

Figure 5A:
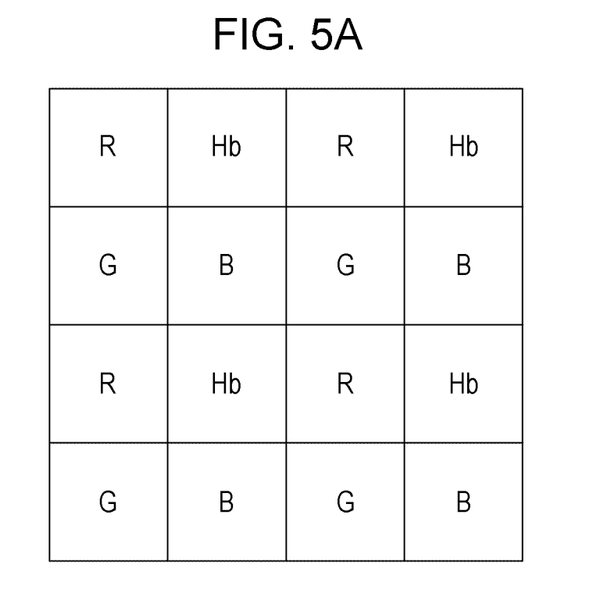
FIGS. 5A and 5B are diagrams illustrating an example of a pixel array of a pixel array portion according to the embodiment of the present technology.
Figure 5B:
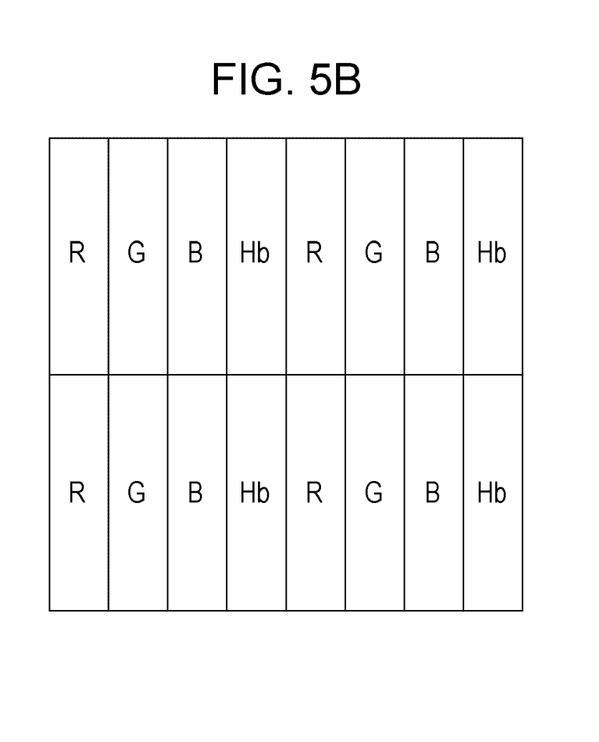

FIGS. 5A and 5B are diagrams illustrating an example of a pixel array of the pixel array portion 310 according to the embodiment of the present technology. As illustrated in FIG. 5A, the pixel array of the pixel array portion 310 may be assumed to be obtained by arranging four sub-pixels in a shape of a cross-in-square. This is similar to the pixel array illustrated in FIG. 3. In addition, as illustrated in FIG. 5B, the pixel array of the pixel array portion 310 may be obtained by arrangement in a stripe shape.

An Hb pixel is disposed at a position diagonal to a G pixel in the cross-in-square structure and thus it is possible to obtain a balance between the centers of luminance. In this case, since the centers of luminance are obtained at two positions of the Hb pixel and the G pixel, a dark line (or bright line) is formed in a boundary between the Hb pixel and the G pixel. As will be described later, since an Hb conversion ratio varies depending on a signal level, image quality is degraded due to an influence of phase shift between the Hb pixel and the G pixel in a form of a signal level causing the Hb conversion ratio to be changed greatly. Thus, it is possible to suppress degradation of the image quality by correcting the phase shift between the Hb pixel and the G pixel and it is possible to improve a resolution by substantially double by increasing the number of the centers of luminance so as to be doubled. An interpolation value of the Hb pixel may be obtained from Hb pixel data of circumferential 4 pixels×4 pixels by using a bicubic interpolation, in order to correct the phase shift. In the stripe structure, it is also possible to obtain balance between the centers of luminance by separately disposing the Hb pixel and the G pixel as each of sub-pixels, similarly.

Image Signal Processing

Figure 6:
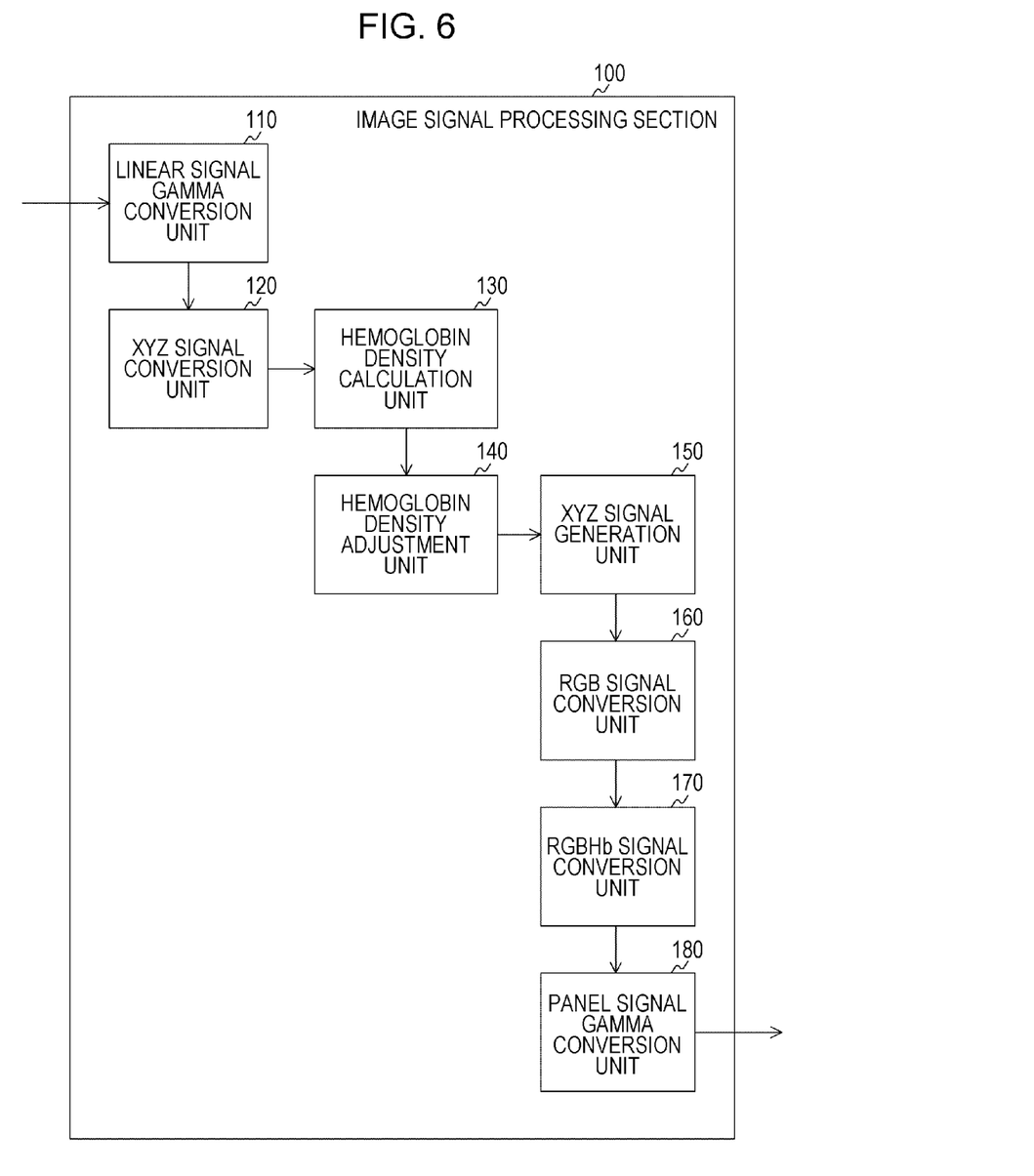
FIG. 6 is a diagram illustrating a configuration example of an image signal processing section according to the embodiment of the present technology.

FIG. 6 is a diagram illustrating a configuration example of the image signal processing section 100 according to the embodiment of the present technology. The image signal processing section 100 includes a linear signal gamma conversion unit 110, an XYZ signal conversion unit 120, a hemoglobin density calculation unit 130, and a hemoglobin density adjustment unit 140. The image signal processing section 100 further includes an XYZ signal generation unit 150, an RGB signal conversion unit 160, an RGBHb signal conversion unit 170, and a panel signal gamma conversion unit 180.

The linear signal gamma conversion unit 110 converts an image signal being the input RGB signal into a linear signal having linear gamma characteristics. That is, the input image signal has non-linear gamma characteristics in which a gamma value is set to, for example, 2.2 in order to correspond to characteristics of a general display apparatus. The linear signal gamma conversion unit 110 converts the non-linear gamma characteristics into the linear gamma characteristics in order for image processing at the subsequent stage to be easily performed. The linear signal gamma conversion unit 110 includes, for example, a lookup table and performs such gamma conversion using the lookup table.

The XYZ signal conversion unit 120 converts the RGB signal which is converted into a linear signal by the linear signal gamma conversion unit 110 into a signal having a color space of XYZ color coordinates. Conversion into the XYZ color coordinates is for calculating density of hemoglobin at the subsequent stage.

The hemoglobin density calculation unit 130 calculates the density of hemoglobin from the signal converted into the XYZ color coordinates by the XYZ signal conversion unit 120. If colors in the XYZ color coordinates are set to X, Y, and Z, the density of hemoglobin is obtained by using the following expression.

$$Hb = a \cdot \log_{10}\left(\frac{1}{X}\right) + b \cdot \log_{10}\left(\frac{1}{Y}\right) + c \cdot \log_{10}\left(\frac{1}{Z}\right) \quad \text{(Expression 1)}$$

Here, constants a, b, and c may be obtained by calculating the X, Y, and Z from spectral reflectance in the representative density to be obtained from absorbance of the pigment of hemoglobin and spectral characteristics of a light source (Xe lamp) when capturing is performed. That is, if the known extinction coefficient of hemoglobin is set to $A_\lambda$, spectral intensity of Xe is set to $I_\lambda$, spectral reflectance of a sample depending on absorption in hemoglobin is set to $R_\lambda$, and color matching functions are set to $X_\lambda$, $Y_\lambda$, $Z_\lambda$, and if Hb density is determined, the X, Y, and Z are obtained as follows. Accordingly, the constants a, b, and c are obtained.

$R_\lambda = 10^{-Hb \cdot A_\lambda}$ $X = \int I_\lambda \cdot R_\lambda \cdot X_\lambda$ $Y = \int I_\lambda \cdot R_\lambda \cdot Y_\lambda$ $Z = \int I_\lambda \cdot R_\lambda \cdot Z_\lambda$ The X, Y, and Z may be obtained by measuring spectral reflectance of an actual blood vessel or the like or may be obtained by disposing an XYZ filter and performing capturing. Here, if a component for determining a color is assumed to be configured by Hb, $HbO_2$, and luminance y, the following expression is established.

$$\begin{pmatrix} Hb \\ HbO2 \\ y \end{pmatrix} = M \cdot \begin{pmatrix} \frac{1}{X} \\ \frac{1}{Y} \\ \frac{1}{Z} \end{pmatrix}$$

where, M refers to a matrix of 3×3. As components of M, constants a1, b1, and c1 may be obtained from a relational expression of the above-described Hb density and the X, Y, and Z and constants a2, b2, and c2 may be obtained from a relationship of $HbO_2$ and the X, Y, and Z in a similar manner. Accordingly, M may be the following expression.

$$M = \begin{pmatrix} a1 & b1 & c1 \\ a2 & b2 & c2 \\ 0 & 1 & 0 \end{pmatrix}$$

The hemoglobin density calculation unit 130 is an example of a density calculation unit described in the embodiments of the present technology.

Figure 7:
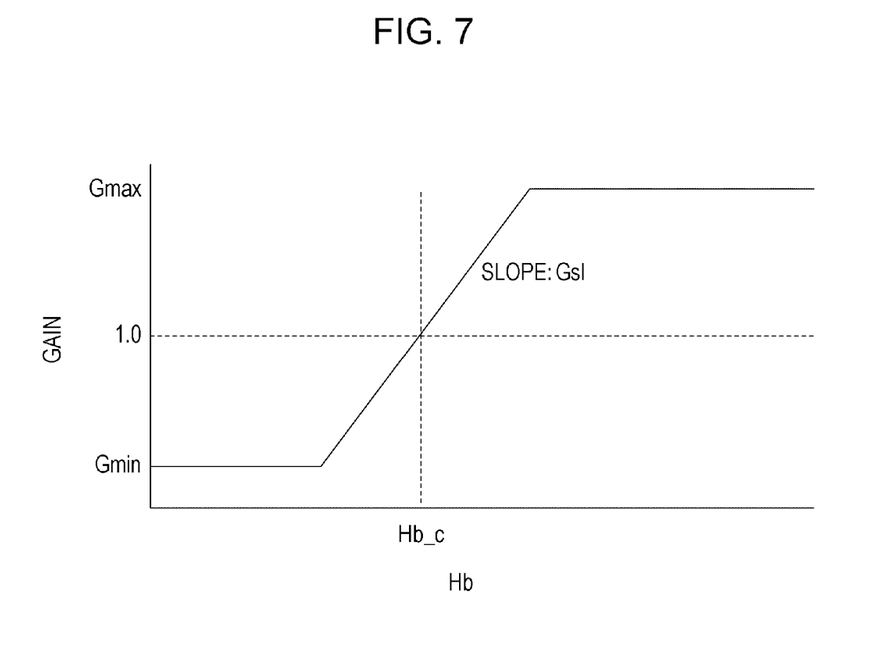
FIG. 7 is a diagram illustrating an example of a function for obtaining a gain of a hemoglobin density adjustment unit according to the embodiment of the present technology.

The hemoglobin density adjustment unit 140 emphasizes or reversely emphasizes the density of hemoglobin calculated by the hemoglobin density calculation unit 130. That is, the hemoglobin density adjustment unit 140 performs a process in such a manner that density at a portion having a high density of hemoglobin is increased and density at a portion having a low density is decreased. Specifically, a gain is obtained from a function of using a value of an Hb ($HbO_2$) signal as an input value, as illustrated in FIG. 7 and the value of the Hb ($HbO_2$) signal is multiplied by the obtained gain. It is possible to make a blood vessel appear and to improve gradation or a resolution property of a color around the blood vessel by adjusting parameters (Hb_c, Gmax, Gmin, slope Gsl) for determining the gain with a displayed output image. The hemoglobin density adjustment unit 140 is an example of an image conversion unit described in the embodiments of the present technology.

The XYZ signal generation unit 150 restores a signal obtained by the hemoglobin density adjustment unit 140 adjusting the density of hemoglobin to a signal of colors in the XYZ color coordinates.

The RGB signal conversion unit 160 restores the signal of colors in the XYZ color coordinates which is restored by the XYZ signal generation unit 150 to an RGB signal.

The RGBHb signal conversion unit 170 converts the RGB signal converted by the RGB signal conversion unit 160 into a signal for four pixels of red, green, blue and a color of the pigment of hemoglobin. The RGBHb signal conversion will be described later. The RGBHb signal conversion unit 170 is an example of a signal conversion unit described in the embodiments of the present technology.

The panel signal gamma conversion unit 180 performs panel gamma conversion which is fit for characteristics of a display device of the display section 300, on the converted RGBHb signal. A signal converted by the panel signal gamma conversion unit 180 is supplied to the display control section 200.

RGBHb Signal Conversion

If XYZ color coordinates of a certain color are set to ($X_T$, $Y_T$, $Z_T$), a relationship of ($X_T$, $Y_T$, $Z_T$) and RGB is represented as the following expression when display is performed in a panel in which colors of the RGB pixels are used as luminous colors. In the following expression, R, G, and B refer to the RGB signal converted by the RGB signal conversion unit 160.

$$\begin{pmatrix} X_T \\ Y_T \\ Z_T \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix}$$

A relationship of ($X_T$, $Y_T$, $Z_T$) and RGBHb is represented as the following expression when display is performed in a panel in which colors of the RGBHb pixels are used as luminous colors.

$$\begin{pmatrix} X_T \\ Y_T \\ Z_T \end{pmatrix} = \begin{pmatrix} X_R & X_G & X_B \\ Y_R & Y_G & Y_B \\ Z_R & Z_G & Z_B \end{pmatrix} \begin{pmatrix} R-r \\ G-g \\ B-b \end{pmatrix} + \begin{pmatrix} X_{Hb} \\ Y_{Hb} \\ Z_{Hb} \end{pmatrix} Hb \quad \text{(Expression 2)}$$

That is, r, g, and b are respectively deducted from the RGB pixels by the extent of a signal applied to the Hb pixel. In this expression, a process of calculating r, g, b, and Hb corresponds to an RGBHb signal conversion process. Calculation of r, g, and b allows RGB values to be obtained by using the following expression.

$$\begin{pmatrix} R_{out} \\ G_{out} \\ B_{out} \end{pmatrix} = \quad \text{(Expression 3)}$$

$$\begin{pmatrix} R_{in} - r \\ G_{in} - g \\ B_{in} - b \end{pmatrix} = \begin{pmatrix} R_{in} \\ G_{in} \\ B_{in} \end{pmatrix} - Hb * \begin{pmatrix} X_R & X_G & X_B \\ Y_R & Y_G & Y_B \\ Z_R & Z_G & Z_B \end{pmatrix}^{-1} \begin{pmatrix} X_{Hb} \\ Y_{Hb} \\ Z_{Hb} \end{pmatrix}$$

Here, an M matrix is simplified and shown as follows.

$$M_{PANEL} = \begin{pmatrix} X_R & X_G & X_B \\ Y_R & Y_G & Y_B \\ Z_R & Z_G & Z_B \end{pmatrix}$$

This $M_{PANEL}$ corresponds to a measurement value obtained when a chromaticity point of each of RGB colors is measured.

$$M_{Hb} = \begin{pmatrix} X_{Hb} \\ Y_{Hb} \\ Z_{Hb} \end{pmatrix}$$

This $M_{Hb}$ corresponds to a measurement value obtained when a chromaticity point of the Hb pixel is measured.

If an expression (Expression 2) of the panel in which the colors of the RGBHb pixels are set to luminous colors is rewritten by using these, the rewritten expression is as follows.

$$\begin{pmatrix} X_T \\ Y_T \\ Z_T \end{pmatrix} = M_{PANEL} \begin{pmatrix} R \\ G \\ B \end{pmatrix} - M_{PANEL} \begin{pmatrix} r \\ g \\ b \end{pmatrix} + M_{Hb} \cdot Hb$$

With this, the following expression is obtained.

$$M_{PANEL} \begin{pmatrix} r \\ g \\ b \end{pmatrix} = M_{Hb} \cdot Hb$$

With this, r, g, and b are represented as follows.

$$\therefore \begin{pmatrix} r \\ g \\ b \end{pmatrix} = M_{PANEL}^{-1} \cdot M_{Hb} \cdot Hb$$

Here, $M_{PANEL}^{-1} \cdot M_{Hb}$ is a measurement value and thus $M_{PANEL}^{-1} \cdot M_{Hb}$ is the known matrix. Accordingly, if an Hb value is determined, unknown quantities being r, g, and b are determined. If $M_{PANEL}^{-1} \cdot M_{Hb}$ is represented by using $K_r$, $K_g$, and $K_b$, $M_{PANEL}^{-1} \cdot M_{Hb}$ is represented as the following expression.

$$M_{PANEL}^{-1} \cdot M_{Hb} = \begin{pmatrix} K_r \\ K_g \\ K_b \end{pmatrix}$$

With this, r, g, and b are represented as follows.

$$\therefore \begin{pmatrix} r \\ g \\ b \end{pmatrix} = \begin{pmatrix} Hb * Kr \\ Hb * Kg \\ Hb * Kb \end{pmatrix}$$

In the expression (Expression 2) of the panel in which the colors of the RGBHb pixels are set to luminous colors, neither of "R-r", "G-g", "B-b" is a negative number. If the above expressions are combined, conditions of the following expressions are obtained.

$R-r=R-Hb \cdot K_r \geq 0$ $G-g=G-Hb \cdot K_g \geq 0$ $B-b=B-Hb \cdot K_b \geq 0$ If the conditions are solved based on Hb, the following expressions are obtained.

$Hb \leq R/K_r, Hb \leq G/K_g, Hb \leq B/K_b$.

It is recognized through the above expressions that the minimum values of $R/K_r$, $G/K_g$, and $B/K_b$ are equal to the maximum value $Hb_{max}$ which is allowable for Hb.

$Hb_{max} = \text{Min}(R/K_r, G/K_g, B/K_b)$.

If RGB values are applied to the Hb pixel up to the maximum which is allowable for being applied to the Hb pixel, the following expression is obtained.

$Hb = Hb_{max}$

Regarding this expression, considering an appearance or a lifetime, allocation to the Hb pixel is controlled by a gain coefficient $G_{Hb}$ as with the following expression.

$Hb = Hb_{max} \cdot G_{Hb}$

If these are put together, an Hb calculation expression is expressed as the following expression.

$Hb_{out} = Hb_{max} \cdot \text{Min}(R/K_r, G/K_g, B/K_b)$     (Expression 4).

In this manner, a value after RGBHb conversion may be calculated by using Expression 3 and Expression 4.

Figure 8:
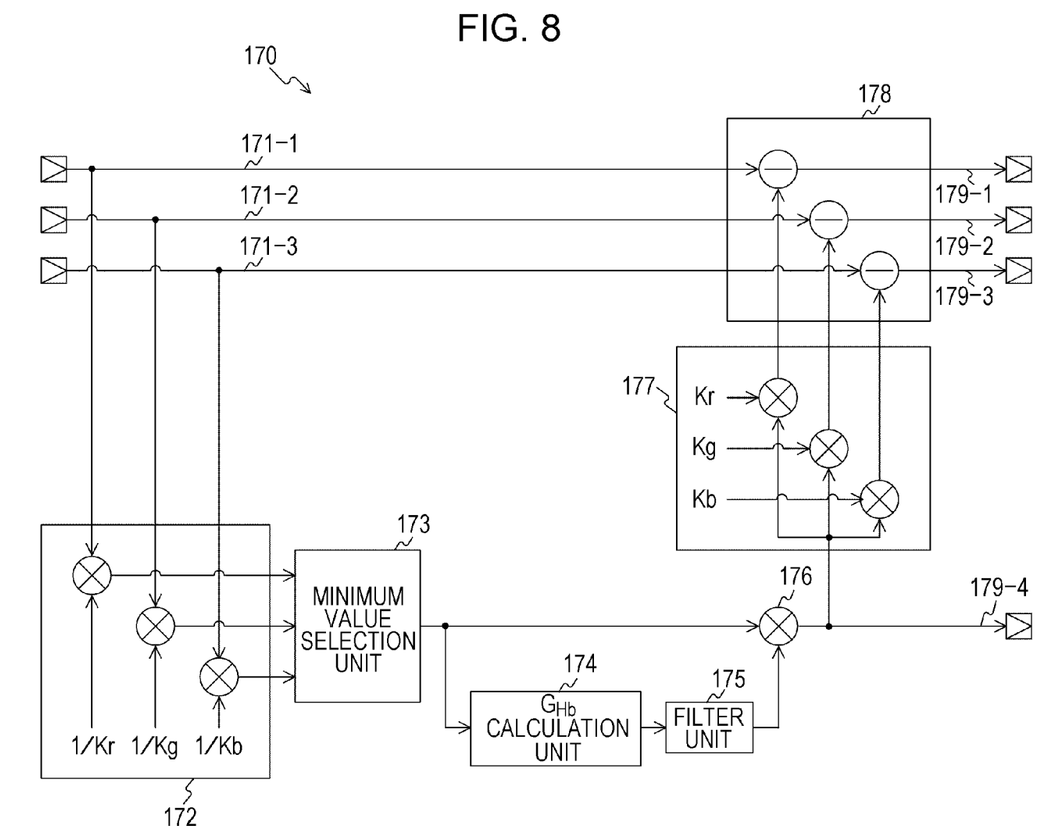
FIG. 8 is a diagram illustrating a configuration example of an RGBHb signal conversion unit according to the embodiment of the present technology.

FIG. 8 is a diagram illustrating a configuration example of the RGBHb signal conversion unit 170 according to the embodiment of the present technology. The RGBHb signal conversion unit 170 performs a hitherto described RGBHb signal conversion process. The RGBHb signal conversion unit 170 includes a multiplier 172, a minimum value selection unit 173, a gain coefficient calculation unit 174, a filter unit 175, a multiplication unit 176, a multiplication unit 177, and a subtraction unit 178.

The multiplier 172 multiplies luminance information 171-1 to 171-3 of each pixel, which is included in an input image signal, by predetermined constants, respectively. Specifically, the multiplier 172 multiplies luminance information 171-1 (R) by a constant 1/K, multiplies luminance information 171-2 (G) by a constant $1/K_g$, and multiplies luminance information 171-3 (B) by a constant $1/K_b$. Here, $K_r$ refers to a value obtained by representing luminance of the red (R) component when the Hb pixel is caused to emit light at the maximum luminance, on the basis of the maximum luminance of the R pixel. Similarly, $K_g$ refers to a value obtained by representing luminance of the green (R) component when the Hb pixel is caused to emit light at the maximum luminance, on the basis of the maximum luminance of the G pixel and $K_b$ refers to a value obtained by representing luminance of the blue (B) component when the Hb pixel is caused to emit light at the maximum luminance, on the basis of the maximum luminance of the B pixel.

The minimum value selection unit 173 selects the minimum among three values supplied from the multiplier 172 as a result of multiplication and outputs the selected minimum as a parameter.

The gain coefficient calculation unit 174 calculates a gain coefficient $G_{Hb}$ indicating an Hb conversion ratio in the corresponding pixel, based on the parameter output from the minimum value selection unit 173 for each pixel. The gain coefficient $G_{Hb}$ indicates a ratio of causing the Hb pixel to emit light and has a value of 0 to 1 in this example. The gain coefficient calculation unit 174 is assumed to include a lookup table in this example and calculate the gain coefficient $G_{Hb}$ for each pixel by using the lookup table.

The filter unit 175 smoothes the gain coefficient $G_{Hb}$ of each pixel supplied from the gain coefficient calculation unit 174 in a horizontal direction and a vertical direction of an image and outputs the smoothed gain coefficient as a gain coefficient $G_{Hb}2$ of each pixel. Specifically, the filter unit 175 is configured by a finite impulse response (FIR) filter, for example.

The multiplication unit 176 generates luminance information 179-4 of the Hb pixel by multiplying the parameter of each pixel supplied from the minimum value selection unit 173 and the gain coefficient $G_{Hb}2$ supplied from the filter unit 175.

The multiplication unit 177 multiplies the luminance information of the Hb pixel generated by the multiplication unit 176 by the respective constants $K_r$, $K_g$, and $K_b$.

The subtraction unit 178 subtracts the corresponding multiplication result obtained by the multiplication unit 177 from each of the luminance information 171-1 to 171-3 which is included in the input image signal and generates luminance information 179-1 to 179-3 of the RGB pixels.

In this manner, the RGBHb signal conversion unit 170 may generate luminance information of the RGBHb pixel when display is performed in a panel in which colors of the RGBHb pixels are used as luminous colors.

Figure 9A:
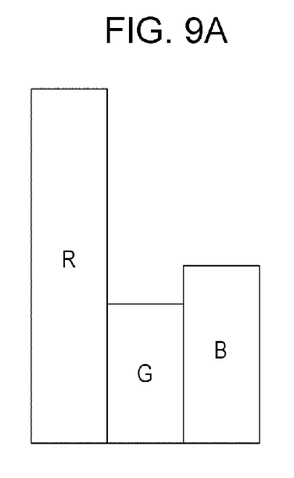
FIGS. 9A and 9B are diagrams illustrating a state example in conversion of an RGBHb signal, according to the embodiment of the present technology.
Figure 9B:
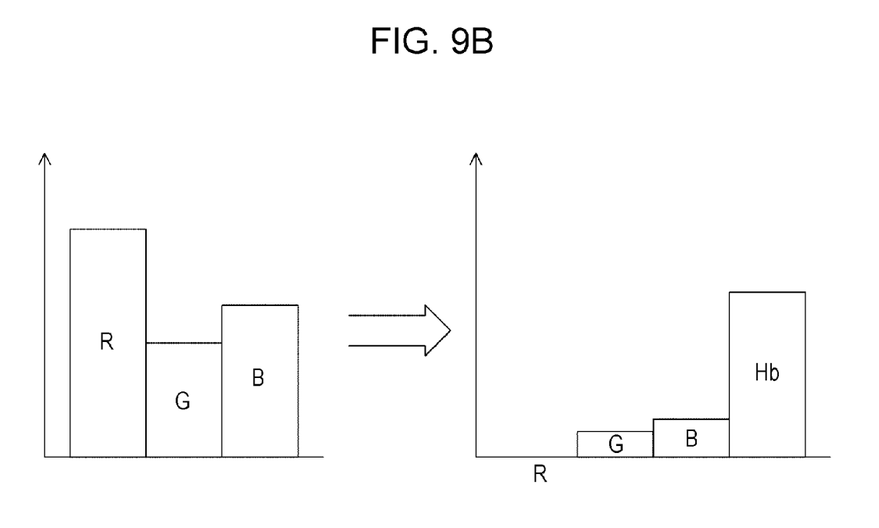

FIGS. 9A and 9B are diagrams illustrating a state example in conversion of an RGBHb signal, according to the embodiment of the present technology. Characteristics of the Hb pixel may be indicated by RGB components as illustrated in FIG. 9A. It is possible to reduce a signal level of the RGB pixels (particularly, R pixel) by assuming such an Hb pixel. That is, as illustrated in FIG. 9B, it is possible to suppress the summation of signal levels of the RGBHb pixels to be small by performing RGBHb signal conversion in such a manner that the Hb pixel is actively used, compared to an RGB pixel array. Accordingly, it is possible to reduce power consumption in a case of the self-luminous display such as an organic EL or in a case of a liquid crystal display in which dimming of a backlight is combined. The signal level is suppressed to be small and thus it is possible to suppress deterioration of pixels in the case of the self-luminous display.

Procedures of Image Signal Process

Figure 10:
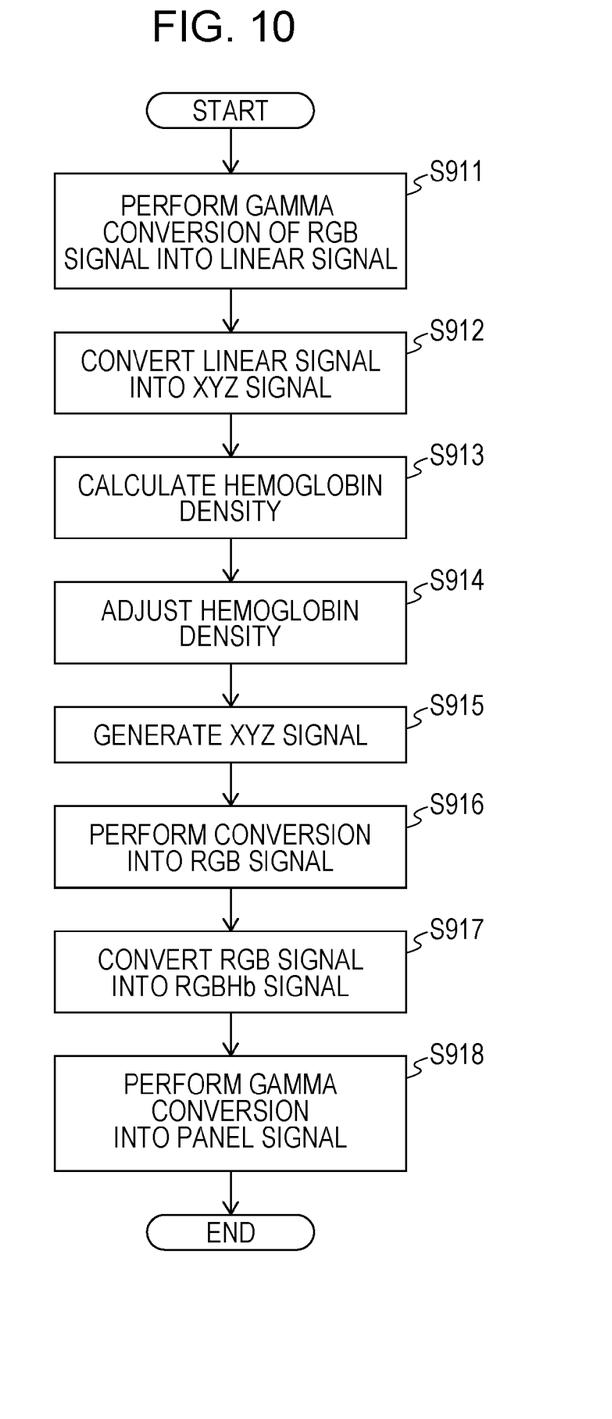
FIG. 10 is a flowchart illustrating an example of process procedures of an image signal process according to another embodiment of the present technology.

FIG. 10 is a flowchart illustrating an example of process procedures of an image signal process according to another embodiment of the present technology.

First, the linear signal gamma conversion unit 110 converts an image signal being an input RGB signal into a linear signal having linear gamma characteristics (Step S911). The XYZ signal conversion unit 120 converts the RGB signal which is converted into the linear signal into a signal having a color space of the XYZ color coordinates (Step S912).

The hemoglobin density calculation unit 130 calculates the density of hemoglobin from the signal which is converted into the XYZ color coordinates by using Expression 1 which is described above (Step S913). The hemoglobin density adjustment unit 140 emphasizes or reversely emphasizes the calculated density of hemoglobin (Step S914). A process of emphasizing or reversely emphasizing the density of hemoglobin is performed in such a manner that the density at a portion having a high density of hemoglobin is increased and the density at a portion having a low density is decreased.

The XYZ signal generation unit 150 restores a signal obtained by adjusting the density of hemoglobin to a signal of colors in the XYZ color coordinates (Step S915). The RGB signal conversion unit 160 restores the signal of colors in the XYZ color coordinates to an RGB signal (Step S916).

The RGBHb signal conversion unit 170 converts the RGB signal obtained by performing such processes into an RGBHb signal by using Expression 3 and Expression 4 which are described above such that display may be performed in a panel in which colors of the RGBHb pixels are used as luminous colors (Step S917).

The panel signal gamma conversion unit 180 performs panel gamma conversion which is fit for characteristics of a display device of the display section 300, on the RGBHb signal converted in this manner (Step S918). An image signal obtained by performing the panel gamma conversion is an image signal to be displayed on the display section 300.

In this manner, according to the embodiments of the present technology, it is possible to prevent deterioration of pixels and to reduce power consumption when a medical image is displayed by using a panel in which colors of the RGBHb pixels are used as luminous colors. It is possible to improve gradation or a resolution property of a color around a blood vessel by performing adjustment in accordance with density of hemoglobin.

2. Modification Example

In the above-described embodiments, an example of the image display apparatus is described. However, an image signal processing apparatus may be provided on the premise that display is performed in a panel in which colors of the RGBHb pixels are used as luminous colors. That is, in this image signal processing apparatus, the image signal processing section 100 illustrated in FIG. 6 is configured as an individual apparatus and at least a component corresponding to the RGBHb signal conversion unit 170 is included. In addition, components corresponding to the hemoglobin density calculation unit 130 and the hemoglobin density adjustment unit 140 may be further included.

According to the modification example, it is possible to prevent deterioration of pixels and to reduce power consumption when a medical image is displayed when the panel is used in which colors of the RGBHb pixels are used as luminous colors.

While certain embodiments have been described, these embodiments have been presented by way of one example for implementing the present technology. Items in the embodiments and specific items for the technology in the embodiments of the present technology have corresponding relationships. Similarly, specific items for the technology in the embodiments of the present technology and items in the embodiments of the present technology, which has the same names as those of the specific items have corresponding relationships, respectively. These embodiments are not intended to limit the scope of the present technology and may be implemented in a form of applying various modifications to the embodiments without departing from the spirit of the technology.

The process procedures described in the above-described embodiments may be considered as a method having a series of the procedures and considered as a program for causing a computer to execute the series of the procedures or a recording medium for storing the program. Examples of the recording medium may include a compact disc (CD), a minidisc (MD), a digital versatile disc (DVD), a memory card, a Blu-ray (registered trademark) disc, and the like.

The effects described in the specification are only examples and thus are not limited thereto and other effects may be made.

The present technology may have a configuration as follows.

(1) An image display apparatus including: a pixel array including a first pixel of a red luminous color, a second pixel of a green luminous color, a third pixel of a blue luminous color, and a fourth pixel of a luminous color of pigment of hemoglobin.

(2) The apparatus according to (1), in which the luminous color of the fourth pixel has strong light intensity in the order of a third region, a first region, and a second region when the first region including a wavelength of 500 nm, the second region including a wavelength of 550 nm, and the third region including a wavelength of 620 nm are set.

(3) The apparatus according to (1) or (2), further including: a signal conversion unit that converts an input signal for sub-pixels with three colors of red, green, and blue into a signal for sub-pixels with four colors of red, green, blue, and a color of pigment of hemoglobin, for the pixel array.

(4) The apparatus according to any one of (1) to (3), further including: a density calculation unit that calculates distribution of density of the pigment of hemoglobin from an input signal for sub-pixels with three colors of red, green; and blue and an image conversion unit that performs image conversion in accordance with the density, for the pixel array.

(5) The apparatus according to (4), in which the image conversion unit performs the image conversion in such a manner that density at a portion having high density is increased and density at a portion having low density is decreased.

(6) A color filter which is provided to correspond to a pixel array including a first pixel of a red luminous color, a second pixel of a green luminous color, a third pixel of a blue luminous color, and a fourth pixel of a luminous color of pigment of hemoglobin.

(7) An image signal processing apparatus including: a signal conversion unit that converts an input signal for sub-pixels with three colors of red, green, and blue into a signal for sub-pixels with four colors of red, green, blue, and a color of pigment of hemoglobin, for a pixel array including a first pixel of a red luminous color, a second pixel of a green luminous color, a third pixel of a blue luminous color, and a fourth pixel of a luminous color of pigment of hemoglobin.

(8) An image signal processing apparatus including: a density calculation unit that calculates distribution of density of pigment of hemoglobin from an input signal for sub-pixels with three colors of red, green, and blue; and an image conversion unit that performs image conversion in accordance with the density, for a pixel array including a first pixel of a red luminous color, a second pixel of a green luminous color, a third pixel of a blue luminous color, and a fourth pixel of a luminous color of pigment of hemoglobin.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
   a pixel array including
      a first pixel of a red luminous color,
      a second pixel of a green luminous color,
      a third pixel of a blue luminous color, and
      a fourth pixel of a luminous color of pigment of hemoglobin, wherein the luminous color of the fourth pixel has strong light intensity in an order of a third region, a first region, and a second region when the first region including a wavelength of 500 nm, the second region including a wavelength of 550 nm, and the third region including a wavelength of 620 nm are set.

2. The image display apparatus according to claim 1, further comprising:
   a signal conversion unit that converts an input signal for sub-pixels with three colors of red, green, and blue into a signal for sub-pixels with four colors of red, green, blue, and a color of pigment of hemoglobin, for the pixel array.

3. An image display apparatus comprising:
   a pixel array including
      a first pixel of a red luminous color,
      a second pixel of a green luminous color,
      a third pixel of a blue luminous color, and
      a fourth pixel of a luminous color of pigment of hemoglobin;
   a density calculation unit that calculates distribution of density of the pigment of hemoglobin from an input signal for sub-pixels with three colors of red, green, and blue; and
   an image conversion unit that performs image conversion in accordance with the density, for the pixel array.

4. The image display apparatus according to claim 3, wherein
   the image conversion unit performs the image conversion in such a manner that density at a portion having high density is increased and density at a portion having low density is decreased.

5. A color filter which is provided to correspond to a pixel array including:
   a first pixel of a red luminous color,
   a second pixel of a green luminous color,
   a third pixel of a blue luminous color, and
   a fourth pixel of a luminous color of pigment of hemoglobin, wherein the luminous color of the fourth pixel has strong light intensity in an order of a third region, a first region, and a second region when the first region including a wavelength of 500 nm, the second region including a wavelength of 550 nm, and the third region including a wavelength of 620 nm are set.

6. An image signal processing apparatus comprising:
   a signal conversion unit that converts an input signal for sub-pixels with three colors of red, green, and blue into a signal for sub-pixels with four colors of red, green, blue, and a color of pigment of hemoglobin, for a pixel array including a first pixel of a red luminous color, a second pixel of a green luminous color, a third pixel of a blue luminous color, and a fourth pixel of a luminous color of pigment of hemoglobin, wherein the luminous color of the fourth pixel has strong light intensity in an order of a third region, a first region, and a second region when the first region including a wavelength of 500 nm, the second region including a wavelength of 550 nm, and the third region including a wavelength of 620 nm are set.

7. An image signal processing apparatus comprising:
   a density calculation unit that calculates distribution of density of pigment of hemoglobin from an input signal for sub-pixels with three colors of red, green, and blue; and
   an image conversion unit that performs image conversion in accordance with the density, for a pixel array including a first pixel of a red luminous color, a second pixel of a green luminous color, a third pixel of a blue luminous color, and a fourth pixel of a luminous color of pigment of hemoglobin.

* * * * *